(12) United States Patent
Blanchard et al.

(10) Patent No.: US 8,121,380 B2
(45) Date of Patent: Feb. 21, 2012

(54) COMPUTERIZED IMAGING METHOD FOR A THREE-DIMENSIONAL RECONSTRUCTION FROM TWO-DIMENSIONAL RADIOLOGICAL IMAGES; IMPLEMENTATION DEVICE

(75) Inventors: Bertrand Blanchard, Bordeaux (FR); Fouad Elbaroudi, Pessac (FR)

(73) Assignee: Axs Ingenierie, Le Havre (FR)

( * ) Notice: Subject to any disclaimer, the term of this patent is extended or adjusted under 35 U.S.C. 154(b) by 476 days.

(21) Appl. No.: 12/375,186

(22) PCT Filed: Jul. 27, 2007

(86) PCT No.: PCT/FR2007/051742
§ 371 (c)(1),
(2), (4) Date: Apr. 14, 2009

(87) PCT Pub. No.: WO2008/012479
PCT Pub. Date: Jan. 31, 2008

(65) Prior Publication Data
US 2010/0232670 A1    Sep. 16, 2010

(30) Foreign Application Priority Data

Jul. 27, 2006  (FR) .................................... 06 06915

(51) Int. Cl.
*G06K 9/00* (2006.01)

(52) U.S. Cl. .................................................... 382/132

(58) Field of Classification Search ............... 382/132
See application file for complete search history.

(56) References Cited

U.S. PATENT DOCUMENTS

| | | | | |
|---|---|---|---|---|
| 5,245,539 | A | * | 9/1993 | Romeas et al. ............... 382/132 |
| 7,519,212 | B2 | * | 4/2009 | Brady et al. .................. 382/132 |
| 2003/0113006 | A1 | | 6/2003 | Berestov |
| 2005/0008219 | A1 | * | 1/2005 | Pomero et al. ............... 382/154 |
| 2008/0137934 | A1 | * | 6/2008 | Sakaguchi et al. ........... 382/132 |
| 2008/0199060 | A1 | * | 8/2008 | Boyden et al. ............... 382/131 |

OTHER PUBLICATIONS

"Incorporation of patient displacement into a trunk reconstruction technique" Engineering in Medicine and Biology Society, 1995, IEEE 17th Annual Conference Montreal, Que., Sep. 20, 1995, pp. 385-386, XP010215421.
"Indices of torso asymmetry related to spinal deformity in scoliosis" Clinical Biomechanics, Butterworth Scientific Ltd, Guildford, GB, vol. 17, No. 8, Oct. 2002, pp. 559-568, XP004380899.
International PCT Search Report issued on Nov. 20, 2007, Application No. PCT/FR2007/051742.

* cited by examiner

*Primary Examiner* — Rodney Fuller
(74) *Attorney, Agent, or Firm* — Young & Thompson

(57) ABSTRACT

A set of surface reference marks (26, 26') detectable by a surface sensor (4) is disposed on the surface of the subject for acquiring three-dimensional or 3D surface images of the surface of the subject, the surface reference marks being radio-opaque; with each radiological image (3, 3') acquired is associated a corresponding surface image acquired at substantially the same time; an iterative process includes a phase of incidence angle calculation (10) and a phase of deformation calculation (11), intended to determine (15) the relative positions of the radiological images and the surface images as well as to perform a positioning (16) in the three dimensions of the radiological images by assuming an absence of deformation of the subject, and intended to determine (19) and correct (21) on the radiological images the deformations of the subject for the relative positions determined in the phase of incidence angle calculation.

20 Claims, 4 Drawing Sheets

Figure 1:
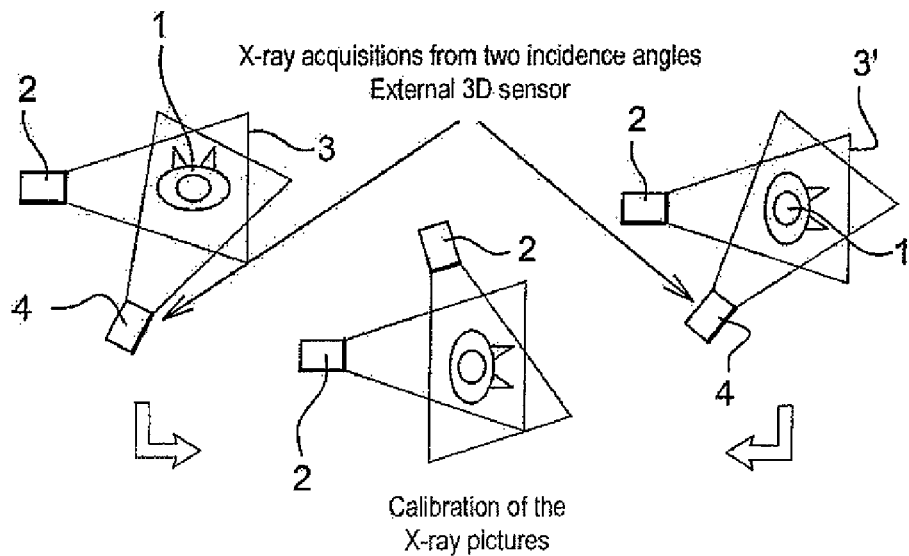

COMPUTERIZED IMAGING METHOD FOR A THREE-DIMENSIONAL RECONSTRUCTION FROM TWO-DIMENSIONAL RADIOLOGICAL IMAGES; IMPLEMENTATION DEVICE

The present invention relates to a computerized, X-ray radiological image processing method for a three-dimensional reconstruction from two-dimensional images, as well as a device for implementing said method. It has applications in the field of radiology.

Radiological imaging systems are known, such as scanner or MRI systems, which allow to obtain, after reconstruction, three-dimensional images of all the parts of a patient, bones as well as surrounding tissues. Such systems, for example the CAT scanner, allow to obtain very fine radiological images in the three-dimensions, but, however, they are very costly and relatively heavy to implement, not including the substantial radiation dose received by the patient. But for some types of examination, notably those relating bone structures which, among the body elements, are those which can be the best seen by radiography, such a fineness is not necessary. It is notably the case for posture problems, and all the problems related to the vertebral column in general. Thus, it can be interesting to use conventional radiological devices producing two-dimensional (2D) images and to reconstruct three-dimensional (3D) images from a plurality of two-dimensional images taken from different orientations or incidence angles. Advantageously, these 2D acquisitions can be made with the patient in stand-up position, unlike prior art devices implementing 3D reconstruction methods, which require the patient to be lying down. Such an approach would allow examinations of this type to be accessible to the greatest number and for a reasonable cost. However, when several pictures are taken from different orientations or incidence angles, unless using several X-ray sources to take synchronous images, the patient may be deformed, which deteriorate the 3D reconstruction.

Indeed, to obtain a 3D reconstruction, it is necessary to have two views of a same area to be examined under different incidence angles. Theses two views must satisfy the following two criteria: on the one hand, the patient must not be deformed between the two views; and on the other hand, it must be possible to go back to the relative position of the sources of the two views with respect to the object. If these two conditions are fulfilled, the space calibration is considered as being ensured.

Conventionally, in the case of traditional protocols for radiographic picture acquisition, these two conditions are not respected because the radiographic views from different incidence angles are taken successively. Now, between two views, the patient breathes or takes another posture. It results a deformation of the patient and thus a non-correspondence of the patient's structures between the two views. Moreover, the radiographic image does not have depth-notion as a conventional photograph. Thus, it is not possible to rely on the perspective to identify the relative position of the two acquisitions. It is therefore very difficult to consider determining the relative positioning of the two acquisitions in a common referential system based uniquely upon the radiograph information.

To overcome these difficulties, it has been proposed in WO 03/099124 a mechanical installation for ensuring that the patient who is radiographed is not deformed during his/her displacement with respect to the X-ray source. A rotatable patient-supporting plate is implemented, having a patient-immobilizing frame and radio-opaque reference marks. However, this installation necessitates a relatively bulky equipment in the framework of a systematic clinical use, as well as an appropriate radiography room (greater than for a traditional use), and thus it can not be adapted to any radiological station.

It has also been proposed in WO 04/111948 to use two distinct X-ray sources with predefined respective positions to take synchronous pictures. Such a system is thus not based on standard radiology equipments because the latter have only one X-ray source. Consequently, such a system requires additional investment for a radiological device.

A method for optically reconstruct the radiographic geometry is known from US-2003/113006.

Finally, the application PCT/FR2003/003943 (WO 2004/061721) describes a biomechanical simulation method for surgery aid, which implements a step in which a resectioning is performed between internal radiological images and external acquisition data.

The present invention proposes to use a conventional radiological equipment and to determine the displacements and deformations of the radiographed subject between two acquisitions from different orientations so as to correct directly the deformations on the interpretation of the radiological data. Such an approach is different from the prior solutions in that it does not search to constrain the displacements and to avoid deformations of the object between two acquisitions.

Therefore, the invention relates to a computerized radiological imaging method for a three-dimensional reconstruction from two-dimensional radiological images of an area of interest, in which two two-dimensional radiological images of a subject are acquired through radiographic means coupled to a computer equipment, the radiological images being taken successively from different incidence angles relative to the subject, the subject having possibly been deformed between the radiological image acquisitions.

According to the invention, the following steps are performed:

disposing on the surface of the subject, in relation with the area of interest, a set of surface reference marks detectable by a surface sensor independent of the radiographic means, for acquiring three-dimensional or 3D surface images of the subject's surface in the computer equipment, wherein the surface reference marks are radio-opaque to be visible on the acquired radiological images and the surface sensor may be fully independent of the radiographic means, associating with each acquired radiologic image a corresponding surface image acquired at substantially the same time, implementing an iterative process comprising a phase of incidence angle calculation and a phase of deformation calculation, the phase of incidence angle calculation being intended to determine the relative positions of the radiological images and the surface images as well as to perform a spatial positioning in the three dimensions of the radiological images, assuming an absence of deformation of the subject, the phase of deformation calculation being intended to determine and correct on the radiological images the deformations of the subject for the relative positions determined in the phase of incidence angle calculation, and the criterion for stopping the iteration being based on the deviation between the 3D coordinates of same reference marks between two successive iterations, that is a previous iteration i−1 and a current iteration i, the current 3D coordinates of the reference marks of a current iteration i being calculated by determining a deformation gradient obtained from the two acquired surface images, applying this gradient to the radiological images of the previous iteration i−1 to obtain current corrected radiological images i, and then calculating the new current 3D coordinates of the reference marks from the current corrected radiological images i, the positions of the reference marks of the previous iteration i−1 corresponding to the positions of the reference marks on the initially acquired surface images, and in the case of a first iteration, the radiological images of the previous iteration corresponding to the acquired radiological images.

In various embodiments of the method according to the invention, the following means are used, which can be used alone or in any technically possible combination:

when the relative position of the radiography means with respect to the surface sensor is not known a priori, the relative position of the radiology means with respect to the surface sensor is determined by projection onto the plane of the radiological images of the reference mark 3D coordinates obtained on the surface images, and comparison with the real coordinates of the same radio-opaque reference marks on the radiological images;

the surface sensor can be an optical sensor of the "Moiré fringe" type allowing a calculation of relief from projection of structured light (patterns) onto the studied surface, or a sensor by palpation of the surface insofar as the subject can not move between the X-ray acquisition and the surface optical acquisition;

during the correction of the radiological images, the surface contour lines of each of the two surface images are projected onto the radiological image plane, the deviation between the projected contour lines giving the deformation gradient;

a surface reference mark having two scaled lines is placed;

when the area of interest is the vertebral column, a surface reference mark is placed on the top of the vertebral column;

at least three reference marks are placed onto the surface, including at least one dimensional piece of information as an X-ray-visible scale;

the radiography means staying fixed, the subject is rotated to obtain the different incidence angles;

the subject staying fixed, the radiography means are moved around the subject;

the device comprises means for obtaining the external relief of the radiographed part, resectioned in space relative to the radiographic plane;

the method can be extended to more than two incidence angles for radiological images.

The invention also relates to a computerized imaging device for a three-dimensional reconstruction from two-dimensional radiological images of an area of interest, in which two two-dimensional radiological images of a subject are acquired through radiography means coupled to a computer equipment, the radiological images being taken successively from different incidence angles relative to the subject, the subject having possibly been deformed between two successive acquisitions, the device comprising means for executing the method according to one or more of the above-listed characteristics.

The method of the invention thus allows determination of a 3D space issued from radiographic information, based upon non stereo-corresponding radiographic imaging conditions. It necessitates only one conventional radiographic source to make the stereo-corresponding reconstruction. It does not necessitate the incidence angle between the two radiographic views to be precisely known to permit the stereo-corresponding reconstruction. Moreover, it supports deformations of the subject between the different radiographic views without deterioration of the correspondence between the radiographs for the 3D reconstruction. The method is relatively simple to implement so as to make a 3D exploitation of conventional radiographs unlike the other methods that imply bulky equipment and heavy-to-implement protocol. It can be applied to any digital radiographic system without requiring substantial modifications of the equipment, and the data acquisition times are not lengthened, or very shortly, while very significant advantages in terms of diagnosis are obtained because the 3D imaging is available from a conventional radiographic equipment. The method does not involve additional irradiation of the patient, unlike the CAT-scanner type systems or the like that give 3D data directly. Finally, it allows to correlate precisely the external and internal diagnoses by having simultaneously radiographs and surface data of the subject, repositioned in the same space.

Figure 2:
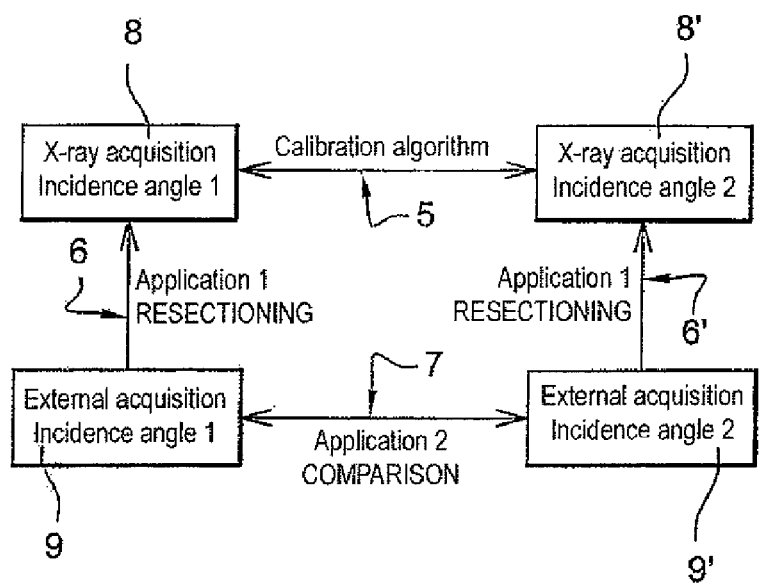
Figure 3:
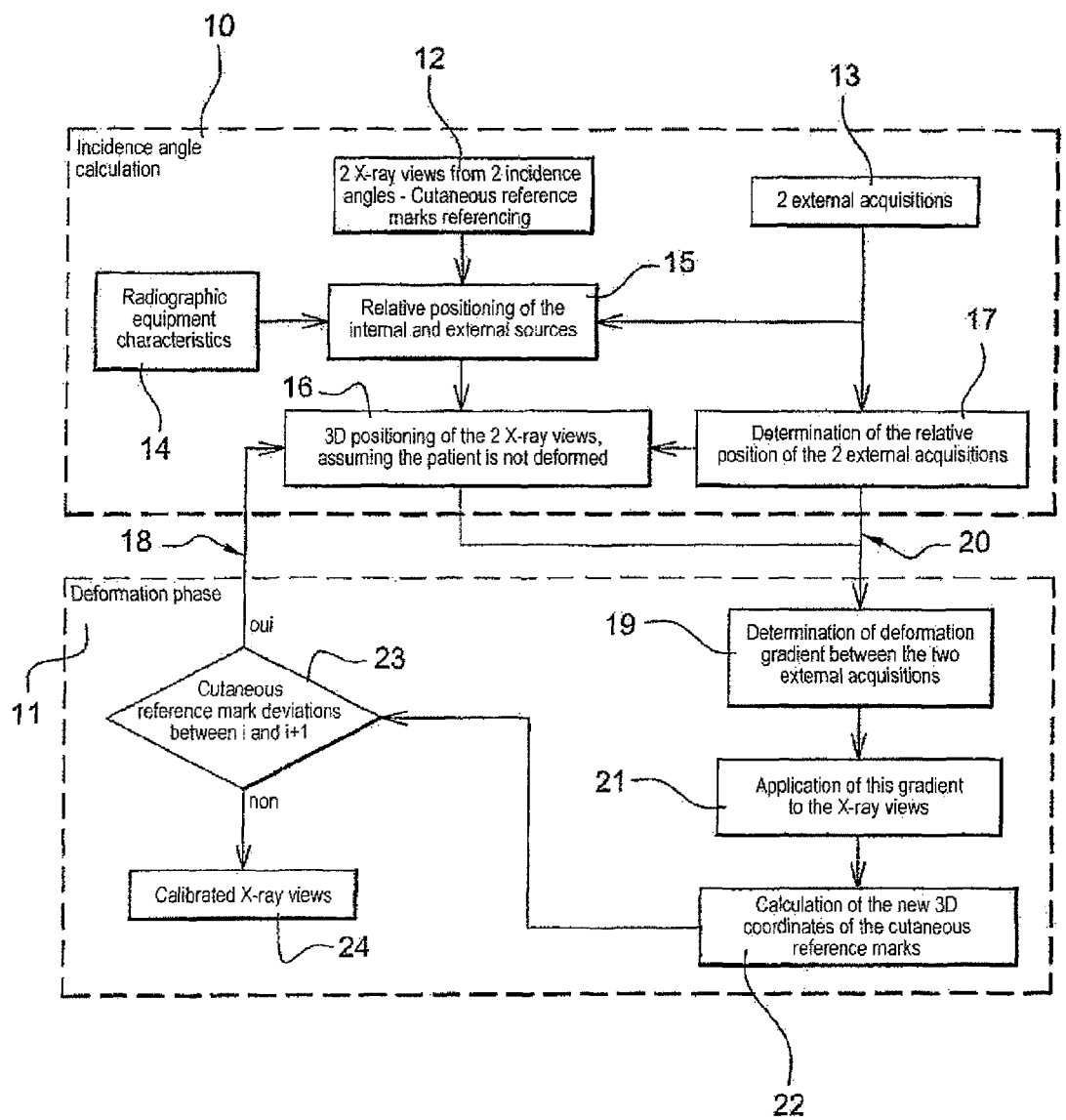
Figure 4:
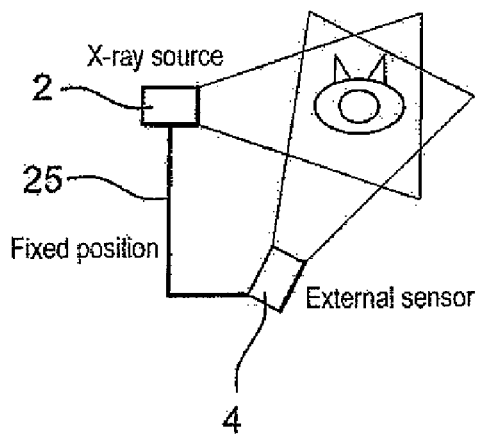
Figure 5:
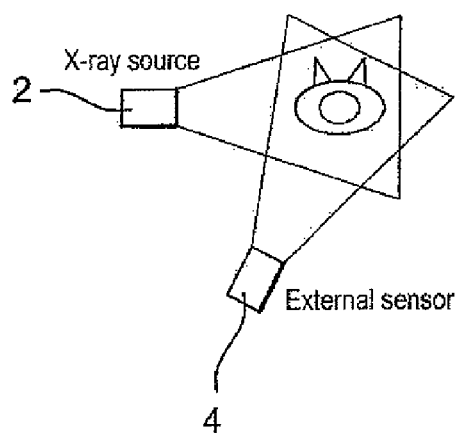
Figure 6:
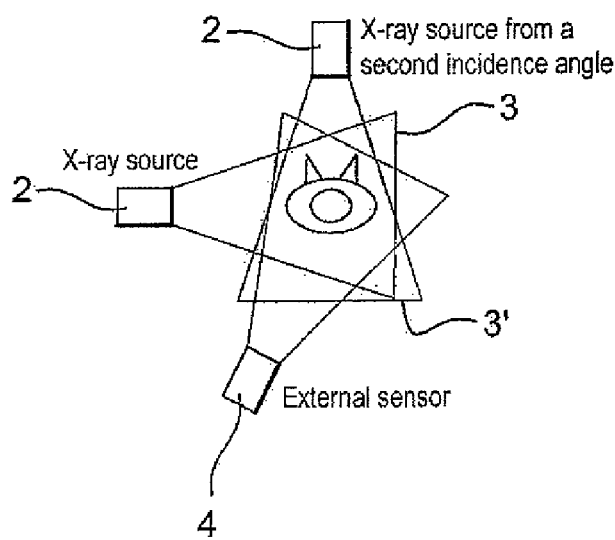
Figure 7:
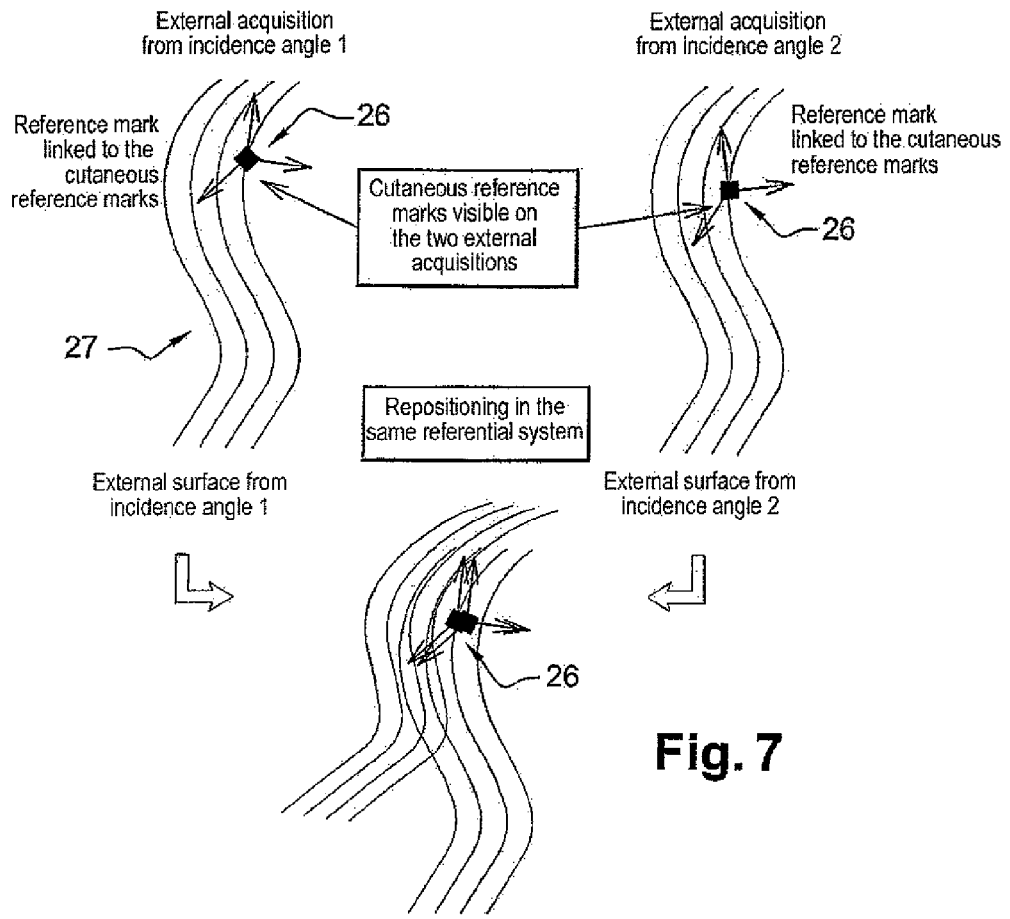
Figure 8:
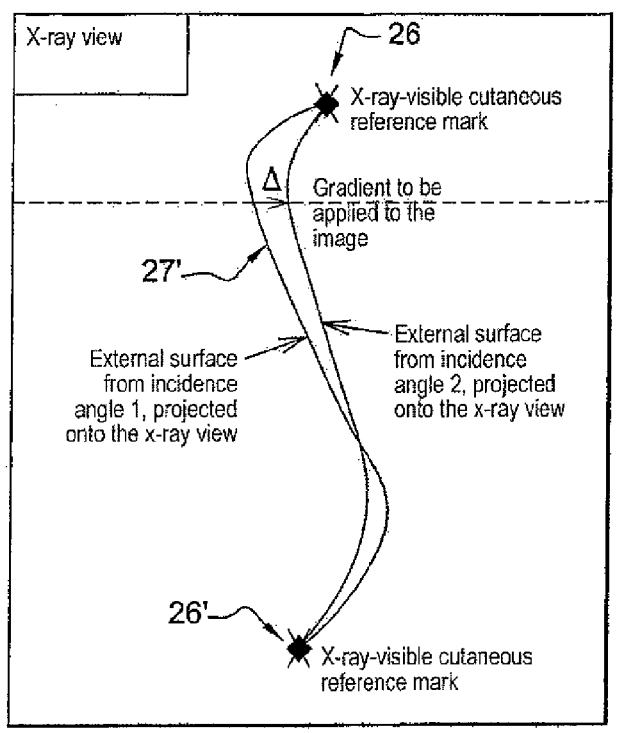

The present invention will now be described in detail through a particular embodiment, the purpose of which is to illustrate the invention without thereby limiting the latter, in connection with the appended drawings, in which:

FIG. 1 schematically shows the calibration of two radiological pictures taken from two different incidence angles, in parallel with the taking of surface (or external) images of a subject;

FIG. 2 schematically shows the interrelation between the resectioning and comparison operations intended for calibrating the radiological images, using the radiological images and the corresponding surface images;

FIG. 3 is a flowchart of the recursive method for calibrating the radiological images, with a phase of incidence angle calculation and a phase of deformation calculation;

FIGS. 4, 5 and 6 schematically show three modalities for the resectioning, or relative positioning, of the X-ray source and the surface sensor;

FIG. 7 shows the determination of the relative position of the two surface images through the use of surface (cutaneous) reference marks, and then the repositioning of said surfaces images in a same 3D referential system; and FIG. 8 shows the correction of the deformation between the radiological images by transposition of information of the surface images, in this case surface lines, in the radiological image space, for application of a correcting gradient to the radiological image.

The invention will now be described in detail, as implemented for 3D acquisition of the vertebral column by a computer equipment comprising means for processing data with a computer program, input/output means, in particular for viewing and/or printing results, as well as an imaging system (acting in real-time or not), for capturing, on the one hand, radiological images in the form of radiological digital data, and, on the other hand, 3D surface images of a radiographed subject, also in the form of surface digital data. The 3D images are captured through a 3D surface sensor which is, for example, a Moiré fringe-type surface sensor. The processed data are generally stored as a matrix (2D or 3D one, according to the case) in memories of the computer equipment. The computer equipment is programmed according to a programming-language algorithm.

The method uses jointly radiological images and 3D surface images of a radiographed subject. At least two reference marks are placed on the subject, said reference marks being visible both by the surface sensor and by the radiographic imaging system. The reference marks are positioned on the surface of the subject in areas that are related to the structure to be analyzed, in this case the vertebral column. Thus, three reference marks can be placed along the vertebral column, for example a reference mark toward the top of the vertebral column, a reference mark toward the bottom of the vertebral column, and a scaled third reference mark, such as an X-ray-visible small rule, outside the vertebral column, which provides a scale on the final views.

In FIG. 1, a surface sensor 4, producing three-dimensional images of the subject's surface, is used in parallel with acquisition of two-dimensional radiographic images by the use of an X-ray source 2, from a first incidence angle 3 and from a second incidence angle 3'. For each X-ray incidence angle, a 3D surface image associated with a radiological image at said incidence angle is obtained. Cutaneous reference marks, which are visible on the 3D surface images and which are also radio-opaque and thus visible on the 2D radiographs, are placed on the radiographed subject. It is an advantage that the interesting bone structures, notably the vertebral column, are close to the subject's surface and that their deformations substantially follow those of the neighboring surface. The 3D surface sensor records the surface of the area of interest which is simultaneously (or quasi-simultaneously) radiographed, and this for two different incidence angles. These two incidence angles are obtained either after displacement (in this case a rotation) of the radiographed subject, or after displacement of the X-ray source and the surface sensor. Four images on which reference marks can be seen are obtained: a first surface image of the subject's body from a first sensor incidence angle relative to the subject (for example, a rear right oblique view), a second surface image of the subject's body from a second sensor incidence angle relative to the subject (for example, a rear left oblique view), a first radiological image from a first X-ray incidence angle (for example, a profile view) and a second radiological image from a second X-ray incidence angle (for example, a rear view). The first surface and radiological images are taken at the same time, or substantially at the same time, so that the subject does not have time to move or to deform. The second surface and radiological images are taken at the same time, or substantially at the same time, so that the subject does not have time to move or to deform either. Meanwhile, either the subject will have been rotated with respect to the X-ray source and the surface sensor, or the surface sensor and the X-ray source will have been rotated with respect to the subject.

It is understood that it is preferable to have a certain number of same reference marks visible on the two surface images. Consequently, the rotation between the surface images acquisitions shall be limited. According to the number of reference marks placed on the subject, it is conceivable to "lose" a few ones between the two surface images, provided that at least three same reference marks, visible on the radiological images, are found on the surface images. This problem is not so acute for the radiological images (except in case of a too great contrast, where a reference mark is "lost" on a bone mass). It is also understood that the reference marks are preferentially disposed according to the area of interest. It is also understood that it can be useful to implement reference marks each having a different shape (or comprising a specific sign that is visible both on the radiological images and the surface images, preferably automatically recognizable by the computer equipment) so as to facilitate the association between a same reference mark (sign) on images acquired from different incidence angles, on the radiographs and on the surfaces images.

As shown in FIG. 2, a mutual calibration 5 of the radiological images is implemented through two independent operations, following an iterative process: a resectioning step 6 and a comparison step 7.

The first operation is a resectioning 6 between the surface image 9 (surface acquisition by the surface sensor 4) and the corresponding radiological image 8 (taken at the same/quasi-same time), at the first X-ray incidence angle, and a resectioning 6' between the surface image 9' (surface acquisition by the surface sensor 4) and the corresponding radiological image 8', at the second X-ray incidence angle. This operation is based on the surface reference marks that are also visible on the radiological image. Based upon these reference marks expressed simultaneously in the surface sensor space and in the radiography spaces, the resectioning operation allows to position the radiographs with respect to the surface images. It can be noticed that a resectioning operation is implemented in the application PCT/FR03/03943.

The second operation consists in a comparison 7 between the two surfaces images taken with different sensor incidence angles so as, on the one hand, to extract information from a possible deformation of the subject between the two acquisitions and, on the other hand, to extract information from the relative positioning (difference between the first and second sensor incidence angles) of the surface sensor between the two surface image acquisitions.

As shown in FIG. 2, these two operations are interdependent: the processing of the subject's deformation between the two surface acquisitions has an effect on the position of the cutaneous reference marks and thus interfere with the resectioning operation. An iterative method of calibration shown as a flowchart in FIG. 3 is implemented to perform these operations. This method comprises two phases: a phase of incidence angle calculation 10 and a phase of deformation calculation 11.

In a first phase of incidence angle calculation 10, it is assumed that the subject has not been deformed between the two radiographic acquisitions. It is then determined (block 15) the relative positions of the X-ray source 2 and the surface sensor 4 for the two X-ray incidence angles, based upon:
characteristics on the radiographic equipment (block 14),
the two radiological images with their radio-opaque reference marks and from the two X-ray incidence angles (block 12), and
the two corresponding surface images (block 13) which allow the determination (block 17) of the relative position of the surfaces images. Based upon this relative positioning, obtained at the output of the block 15, the 3D positioning of the two radiographic images, considered without deformation of the subject, can be calculated. It can be noted that, in the recursive process, during a subsequent iteration, corrected radiological images with respect to a possible deformation will be used.

In a second phase of deformation calculation 11, the radiographs are corrected by reverse deformation of the possible deformations evaluated during the operation of surfaces image comparison. By "corrected radiograph", it is meant a modification of interpretation of the radiographs by taking into account the possible movements of the subject between a radiograph taken in strict stereographic conditions and a really acquired radiograph. Based upon these corrected radiographs (deformed by reverse deformation), the new coordinates of the surface reference marks are calculated in the surface referential system (in a way, a transposition of the reference marks of the internal/radiological space toward the external/surface space is made). To this end, a gradient of deformation between the surface images is determined (block 19), this gradient is applied (block 21) to the radiographs, and the new coordinates of the surfaces reference marks are then calculated (block 22) based upon these radiographs. Next, these new coordinates are compared (block 23) with that corresponding to the initial position of the reference marks (i.e. the 3D position of the reference marks on the acquired surface image) with a calculation of deviation. This comparison allows to determine a criterion for stopping the iteration. When the deviation becomes smaller than or equal to a stopping threshold, then the radiographs to which the gradient has been applied are calibrated (block 24). On the contrary, as long as the deviation stays significant (greater than the stopping threshold), the process is looped back (block 18) on the incidence angle calculation (10) using the obtained results (corrected radiological images), which will produce a new 3D positioning (block 16) of the radiological images for use (block 20) in the deformation phase 11. Thus, with this iterative process, the impact of the subject's deformation on the stereo-correspondence conditions is evaluated and corrected.

The first phase of incidence angle calculation will now be described in detail, comprising two steps, a first step with a resectioning operation and a second step with a comparison operation.

In the first step, the resectioning operation 15 is performed to reposition the X-ray source and the plane of the radiological image 12 with respect to the surface sensor 13. This resectioning operation 15 takes place according to three different modalities, based upon the knowledge a priori of the relative positions of the X-ray source and the 3D surface sensor (block 14—radiographic equipment characteristics).

If the surface sensor has a position which stays fixed relative to the X-ray source because the X-ray source 2 is integral with the surface sensor 4, for example by a mechanical coupling 25, as illustrated in FIG. 4, the position of the surface sensor is then entirely determined in the X-ray referential system. The relative position of the surface acquisition with respect to the radiographic image plane is automatically deduced (block 17), without requiring cutaneous reference marks.

If the position of the surface sensor 4 with respect to the X-ray source 2 is not known a priori, as illustrated in FIG. 5, then the 3D positioning of the cutaneous reference marks on the surface acquisition 13 is used. By simulating the projection of these ones on an X-ray plane, it is possible to position (block 15) the X-ray source with respect to the surface sensor, based upon the distances between the reference marks on the real radiographs 12 and their projections onto the radiological image plane.

If the position of the surface sensor is not known and the uncertainty of reference mark positioning on the radiographs is too high for the previous method to be valid, then, as illustrated in FIG. 6, the two radiological images are taken into account, assuming that there is no deformation between the two radiological image acquisitions and that the relative incidence angle between the two radiographs is known (generally fixed to 90°). It is then possible to go back to an approximated 3D X-ray space by determination of the 3D coordinates of the cutaneous reference marks (block 12). The comparison of the coordinates of these cutaneous reference marks then allows to determine the position of the X-ray source with respect to the surface sensor. This approach thus requires to consider this repositioning as being a part of the data to be adjusted in the iterative process of the deformation phase.

In a second step, the comparison operation allows to determine (block 17) the relative positioning of the two surface acquisitions. In this second step, the positioning is obtained based upon the cutaneous reference marks 26 seen under two different incidence angles on the 3D surface images. Considering that the subject has not been deformed between the two view acquisitions and knowing the position of these reference marks for the two surface acquisitions, the two surface image acquisitions are then repositioned in the same referential system, as illustrated in FIG. 7. This positioning thus assumes that a possible deformation of the subject between the view acquisitions affects only slightly the position of the cutaneous reference marks. In a more advanced variant, in order to prevent the effects of a possible deformation, the positioning can be made by taking into account a greater surface (reference marks more numerous and/or distributed over a greater surface) so as to minimize the risks of local errors. In FIG. 7, the wavy lines 27 represent the subject's surface as obtained from a Moiré fringe-type sensor.

Once this positioning performed for the surface images, the two radiological images are repositioned in the same 3D referential system, thus allowing to estimate the possible deformations of the radiographed subject.

The second phase of deformation calculation, which comprises several steps, will now be described.

In a first step, based upon the two 3D surface image acquisitions, the deformation is evaluated by implementing a step 19 for determining a deformation gradient. This evaluation consists in superimposing at best the cutaneous reference marks of the two surface image acquisitions after the repositioning of the phase of incidence angle calculation 10. And then, the 3D deformations appearing on the surface images are quantified, favoring the areas of interest, that is to say the areas close to the internal structures that are studied. For each pixel of area(s) of interest, a 3D deformation gradient is obtained, that is an orientation, a direction and an intensity in the space allowing to pass from a first 3D object to the same 3D object, but deformed.

This deformation gradient is then projected onto the radiographic plane of one of the radiographs, so as to obtain a 2D deformation gradient. This 2D deformation gradient is then applied (step 21), in the reverse direction, to the pixels of the radiographic image, i.e. the interpretation of the radiographic image pixels is corrected by taking into account the calculated deformation gradient. As shown in FIG. 8, this 2D gradient is applied in the reverse direction to correct the deformations of the radiographed subject between the two radiographic image acquisitions so as to simulate a radiograph which would verify the non-deformation of the subject and thus obtain a stereo-correspondence. To this end, the surface lines 27 are projected in the X-ray space to form projected surface lines 27'. The gradient Δ to apply to the radiological image can thus be determined. The radio-opaque reference marks 26 and 26' are visible on the radiological image.

It is to be noted that if, for the resectioning operation of the first phase of incidence angle calculation, the position of the surface sensor is not known and the uncertainty of reference mark positioning on the radiographs is too high, and that the resectioning is performed according to the above-mentioned third modality, the two radiographs are then taken into account, assuming that there is no deformation between the two radiological images and that the relative incidence angle is known. It is then necessary to loop back the phase of deformation calculation and incidence angle calculation. Indeed, the radiograph being possibly deformed, the reference marks taken on the latter for incidence angle calculation are no longer correct. It is thus necessary to readjust the incidence angle calculation by taking into account the deformed radiograph. This readjustment is made through an iterative loop performing again the incidence angle calculation and the deformation calculation based upon the new deformed radiographs. On these radiographs, the positions of the cutaneous reference marks that can be seen on the radiographs have been modified. The recursive test to control the coherence between the deformation of the radiographs and the incidence angle calculation is made on the position of these cutaneous reference marks, between their position on the radiograph and their position measured by the 3D surface sensor, and projected onto the corresponding X-ray plane. As above mentioned, when the deviation between these two positions is small, i.e. smaller than a threshold, the iterative process is considered as being finished.

At the end of the above-described process, two modified radiographs are obtained, which verify the two calibration conditions:

the deformations of the radiographed subject between the two radiographs are corrected, the exact position of the two radiographic images between each other and relative to the radiographed subject is known in the space, and it is then possible to make a 3D interpretation of the information read on the modified radiographic images.

It is understood that the given example of implementation is not the only one and that it is possible to adapt it to other use conditions without departing from the general scope of the invention.

For example, it is possible to move the X-ray source and the surface sensor instead of the subject between the acquisitions.

For example, the surface sensor can be disposed with a view acquisition orientation that is always of 45° with respect to that of the X-ray source so that, even for lateral and frontal X-ray incidences, most of the subject's back (thus of the reference marks) can be seen on the surface images without requiring the surface sensor to be moved.

Finally, the method can be refined by making more than two acquisitions, thus taking into account more than two radiological images, each associated with its surface image.

The invention claimed is:

1. Computerized imaging method for a three-dimensional reconstruction from two-dimensional radiological images of an area of interest, in which two two-dimensional radiological images of a subject are acquired through radiographic means (2, 3, 3') coupled to a computer equipment, the radiological images being taken successively from different incidence angles relative to the subject, the subject having possibly been deformed between the radiological image acquisitions, characterized in that the following steps are performed:

disposing on the surface of the subject, in relation with the area of interest, a set of surface reference marks (26, 26') detectable by a surface sensor (4) independent of the radiographic means for acquiring three-dimensional surface images of the subject's surface in the computer equipment, the surface reference marks being radio-opaque to be also visible on the acquired radiological images, associating with each acquired radiologic image (3, 3') a corresponding surface image acquired at substantially the same time, implementing an iterative process comprising a phase of incidence angle calculation (10) and a phase of deformation calculation (11), the phase of incidence angle calculation being intended to determine (15) the relative positions of the radiological images and the surface images as well as to perform a spatial positioning (16) of the radiological images, assuming an absence of deformation of the subject, the phase of deformation calculation being intended to determine (19) and correct (21) the interpretation of the radiological images to take into account the deformations of the subject for the relative positions determined in the phase of incidence angle calculation, and in that the criterion for stopping the iteration is based on the deviation (23) between the 3D coordinates of same reference marks between two successive iterations, that is a previous iteration i–1 and a current iteration i, the current 3D coordinates of the reference marks of a current iteration i being calculated by determining a deformation gradient obtained from the two acquired surface images, applying this gradient to the radiological images of the previous iteration i–1 to obtain current corrected radiological images i, and then calculating the new current 3D coordinates of reference marks from the current corrected radiological images i, the positions of the reference marks of the previous iteration i–1 corresponding to the positions of the reference marks on the initially acquired surface images, and in the case of a first iteration, the radiological images of the previous iteration corresponding to the acquired radiological images.

2. Method according to claim 1, characterized in that, when the relative position of the radiography means with respect to the surface sensor is not known a priori, the relative position of the radiology means with respect to the surface sensor is determined by projection onto the plane of the radiological images of the reference mark 3D coordinates obtained on the surface images, and comparison with the real coordinates of the same radio-opaque reference marks on the radiological images.

3. Method according to claim 2, characterized in that, when the projection onto the plane of the radiological images of the reference mark 3D coordinates is not possible, the relative position of the radiological means with respect to surface sensor is obtained by iterative adjustment during the phase of deformation calculation.

4. Method according to claim 3, characterized in that the surface sensor can be an optical sensor of the "Moiré fringe" type allowing a calculation of relief from projection of structured light onto the studied surface, or a sensor by palpation of the surface insofar as the subject can not move between the X-ray acquisition and the surface acquisition.

5. Method according to claim 3, characterized in that, when the area of interest is the vertebral column, a surface reference mark, having two X-ray-visible scaled lines, is placed on the top of the vertebral column, and in that radiological images from two different incidence angles are obtained, face and profile views of the subject.

6. Method according to claim 3, characterized in that the subject is rotated to obtain the different incidence angles, the radiography means staying fixed.

7. Method according to claim 3, characterized in that the radiography means are moved around the subject, which stays fixed.

8. Method according to claim 2, characterized in that the surface sensor can be an optical sensor of the "Moiré fringe" type allowing a calculation of relief from projection of structured light onto the studied surface, or a sensor by palpation of the surface insofar as the subject can not move between the X-ray acquisition and the surface acquisition.

9. Method according to claim 2, characterized in that, when the area of interest is the vertebral column, a surface reference mark, having two X-ray-visible scaled lines, is placed on the top of the vertebral column, and in that radiological images from two different incidence angles are obtained, face and profile views of the subject.

10. Method according to claim 2, characterized in that the subject is rotated to obtain the different incidence angles, the radiography means staying fixed.

11. Method according to claim 2, characterized in that the radiography means are moved around the subject, which stays fixed.

12. Method according to claim 1, characterized in that the surface sensor can be an optical sensor of the "Moiré fringe" type allowing a calculation of relief from projection of structured light onto the studied surface, or a sensor by palpation of the surface insofar as the subject can not move between the X-ray acquisition and the surface acquisition.

13. Method according to claim 12, characterized in that, when the area of interest is the vertebral column, a surface reference mark, having two X-ray-visible scaled lines, is placed on the top of the vertebral column, and in that radiological images from two different incidence angles are obtained, face and profile views of the subject.

14. Method according to claim 12, characterized in that the radiography means are moved around the subject, which stays fixed.

15. Method according to claim 1, characterized in that, when the area of interest is the vertebral column, a surface reference mark, having two X-ray-visible scaled lines, is placed on the top of the vertebral column, and in that radiological images from two different incidence angles are obtained, face and profile views of the subject.

16. Method according to claim 15, characterized in that the radiography means are moved around the subject, which stays fixed.

17. Method according to claim 1, characterized in that the subject is rotated to obtain the different incidence angles, the radiography means staying fixed.

18. Method according to claim 1, characterized in that the radiography means are moved around the subject, which stays fixed.

19. Computerized imaging device for a three-dimensional reconstruction from two-dimensional radiological images of an area of interest, in which two two-dimensional radiological images of a subject are acquired through radiography means, the radiological images being taken successively from different incidence angles relative to the subject, the subject having possibly been deformed between the radiological image acquisitions, characterized in that it comprises means adapted for executing the method according to claim 1.

20. Computerized imaging device according to claim 19, characterized in that it comprises means for obtaining the external relief of the radiographed part, resectioned in the space relative to the radiographic plane.

* * * * *